United States Patent [19]

Harrison et al.

[11] Patent Number: 5,217,278
[45] Date of Patent: Jun. 8, 1993

[54] MECHANISM FOR PROVIDING ADJUSTABLE LUMBAR SUPPORT IN A SEAT

[75] Inventors: William D. Harrison, Rochester; Arduino Colasanti, East Detroit, both of Mich.

[73] Assignee: Findlay Industries, Inc., Troy, Mich.

[21] Appl. No.: 669,098

[22] Filed: Mar. 13, 1991

[51] Int. Cl.⁵ ............................................. A47C 3/00
[52] U.S. Cl. ............................. 297/284.7; 297/284.4; 74/501.5 R; 74/502; 74/503; 192/48.91; 192/96
[58] Field of Search ......... 297/284 C, 284 F, 284 FF, 297/363, 364, 365; 74/501.5 R, 502, 503; 192/48.91, 96

[56] References Cited

U.S. PATENT DOCUMENTS

| | | | |
|---|---|---|---|
| 2,371,130 | 3/1945 | Cushman | 74/501.5 R X |
| 2,756,809 | 7/1956 | Endresen | 297/284 F |
| 2,796,922 | 6/1957 | Young | 297/416 |
| 3,747,428 | 7/1973 | Waner et al. | 74/502 X |
| 4,136,577 | 1/1979 | Borgersen | 192/48.91 X |
| 4,153,293 | 5/1979 | Sheldon | 297/284 C |
| 4,156,544 | 5/1979 | Swenson et al. | 297/284 F X |
| 4,316,631 | 2/1982 | Lenz et al. | 297/460 X |
| 4,632,454 | 12/1986 | Naert | 297/284 F |
| 4,730,871 | 3/1988 | Sheldon | 297/284 F |
| 4,821,593 | 4/1989 | Kobylarz | 74/501.5 R X |
| 4,987,793 | 1/1991 | Baumgarten et al. | 74/501.5 R X |
| 4,993,164 | 2/1991 | Jacobsen | 297/284 R X |
| 5,026,116 | 6/1991 | Dal Monte | 297/284 C |
| 5,050,930 | 9/1991 | Schuster et al. | 297/284 F |

FOREIGN PATENT DOCUMENTS 2068718  8/1981  United Kingdom ............... 297/284

Primary Examiner—Kenneth J. Dorner
Assistant Examiner—Milton Nelson, Jr.
Attorney, Agent, or Firm—Weintraub, DuRoss & Brady

[57] ABSTRACT

A lumbar support mechanism for inclusion within a seat back includes a fixed frame, a movable frame which is adjustably mounted to the fixed frame, and an outwardly bowed arcuate resilient lumbar support member which is adjustably mounted to the movable frame. A control box is provided for adjusting the lumbar support member in either a horizontal or vertical direction and a pair of cables interconnect the support mechanism with the control box.

4 Claims, 2 Drawing Sheets

U.S. Patent    June 8, 1993    Sheet 1 of 2    5,217,278
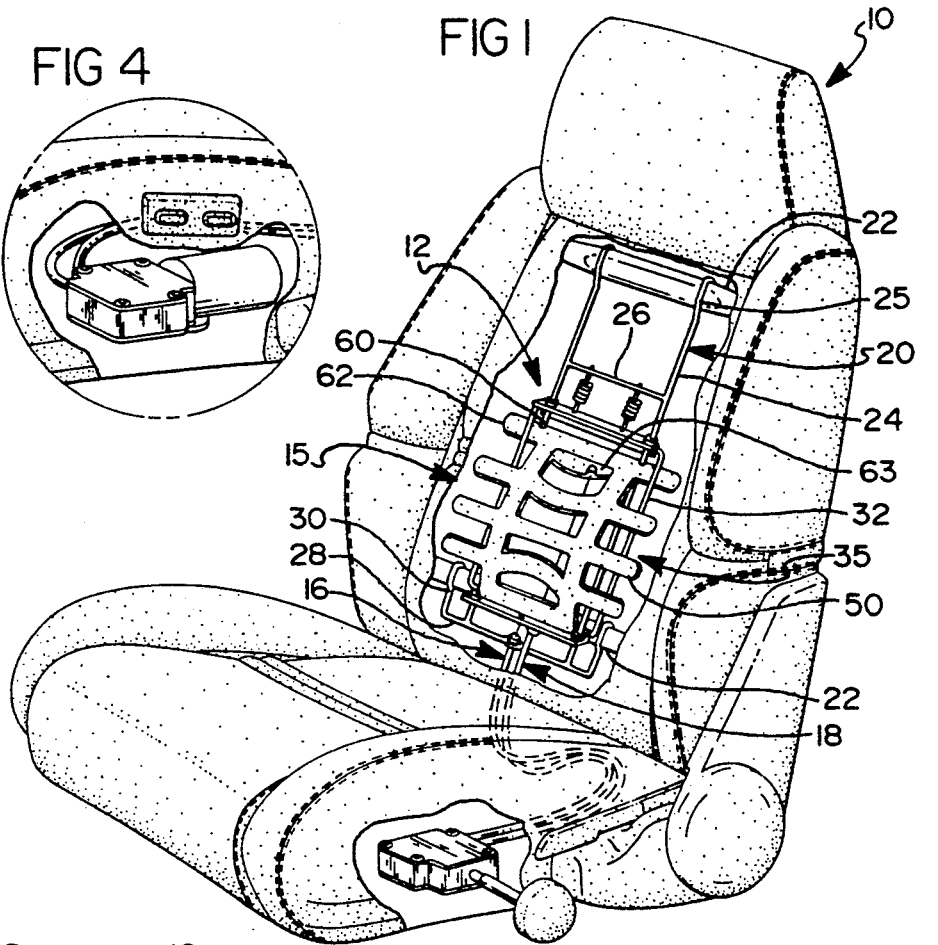
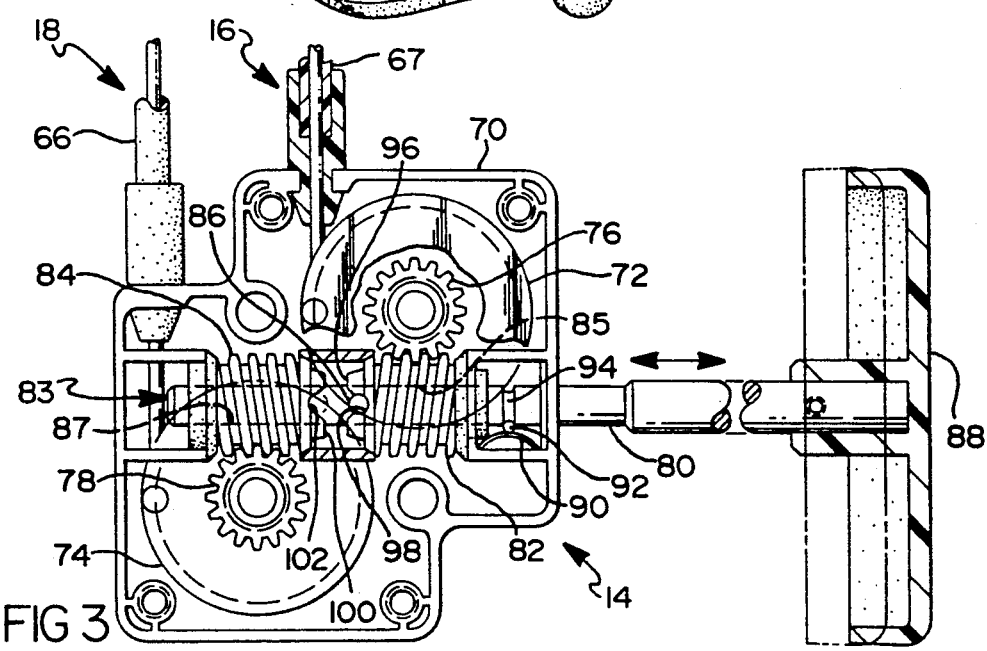

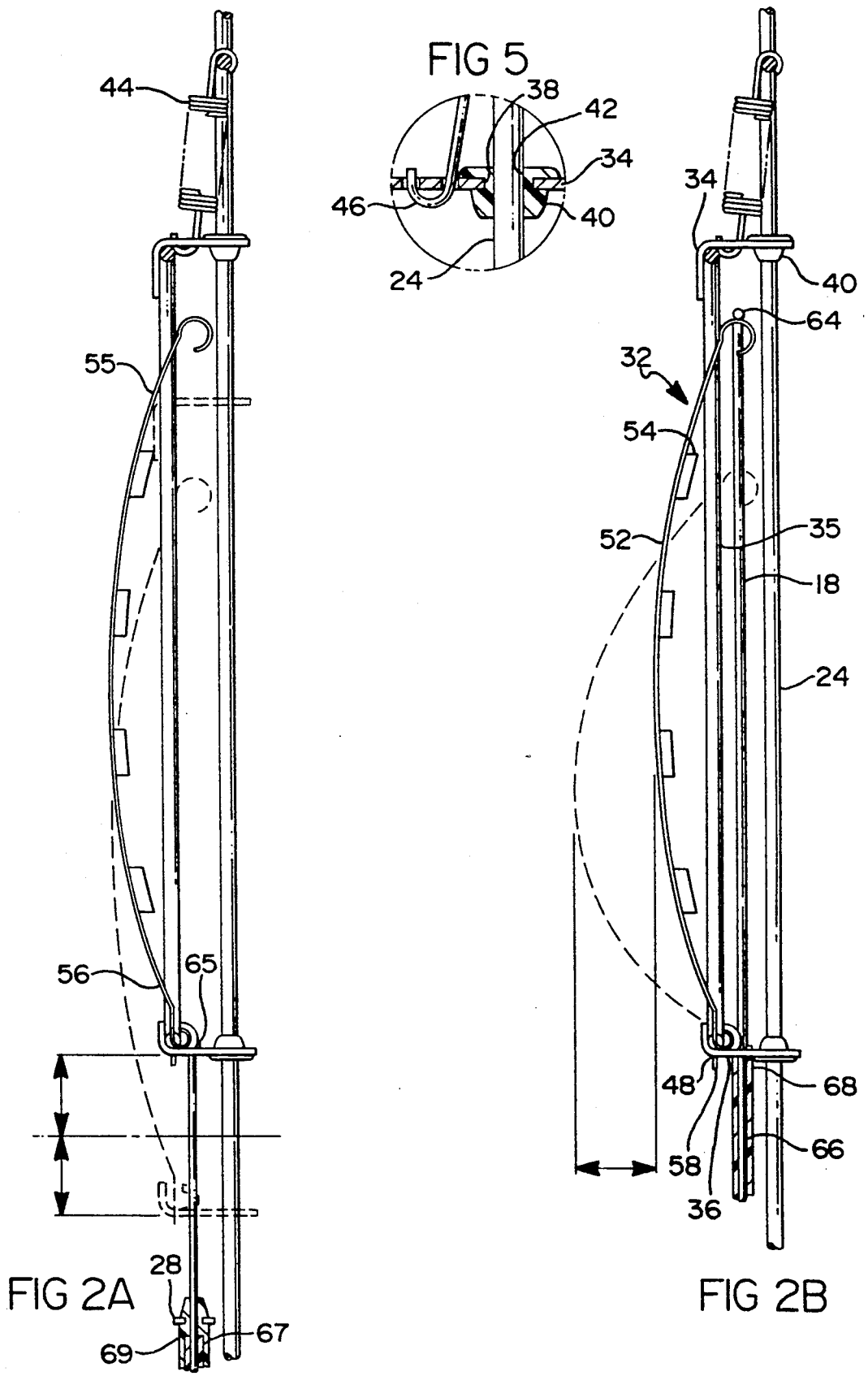

5,217,278

MECHANISM FOR PROVIDING ADJUSTABLE LUMBAR SUPPORT IN A SEAT

BACKGROUND OF THE INVENTION

1. Field of the Invention

The present invention relates to seating devices. More particularly, the present invention relates to seating devices which include adjustable lumbar supports. Even more particularly, the present invention relates to seats with adjustable lumbar supports, in which a lumbar support is adjustable both vertically and horizontally

2. Prior Art

Automotive manufacturers, more and more, are tending to include adjustable seats in modern automobiles. In addition, modern home seating may be adjustable in a variety of ways. Preferably, adjustable seats include a mechanism for adjusting a lumbar support within a seat, in order to adjustably support the lumbar region of a user's back. However, the previous lumbar support devices, generally, include a large number of parts and are complicated to manufacture, or require separate controls for different movements of the lumbar support. Not all previously available lumbar supports in seating devices can be vertically moved within a seat to suit the needs of a particular user.

A need exists in the seating art for a lumbar support mechanism which is adjustable both horizontally and vertically to provide a maximum level of comfort and convenience for a user thereof. Optimally, a lumbar support mechanism would be adjustable for both vertical and horizontal travel with a single control mechanism.

SUMMARY OF THE INVENTION

The present invention provides a support mechanism for the lumbar area of the back of a user thereof, for use in a seating device, the mechanism being separately adjustable for both vertical and horizontal motion of a lumbar support member.

An apparatus in accordance with the present invention, generally, comprises:

(a) a fixed frame for placement within a seat back;

(b) a movable frame which is adjustably mounted on the fixed frame and which is slidably movable thereon;

(c) an outwardly bowed arcuate lumbar support member, which is formed from a flexible resilient material, and which is adjustably mounted on the movable frame, the lumbar support member having an upper end and a lower end which is disposed at a distance from the upper end;

(d) means for variably adjusting the distance between the upper and lower ends of the lumbar support member; and (e) means for slidably moving the movable frame with respect to the fixed frame.

For a more complete understanding of the present invention, the reader is referred to the following detailed description section, which should be read in conjunction with the accompanying drawings. Throughout the following description and in the drawings, like reference numbers are used to refer to like parts throughout the several views, in which:

BRIEF DESCRIPTION OF THE DRAWINGS

FIG. 1 is a perspective view, partially cut away, showing a seat incorporating the lumbar support apparatus hereof;

FIGS. 2A and 2B are side elevational views of the lumbar support member and associated hardware, showing the various ways in which the support member can be adjusted using the control mechanism hereof;

FIG. 3 is a elevational view, partially in cross-section, of the control mechanism of FIG. 1;

FIG. 4 is a partial cut away view of a seat with an alternative control mechanism for use in the present invention; and FIG. 5 is a cross-sectional view of a portion of an upper mounting bracket of FIG. 2.

DETAILED DESCRIPTION OF THE PREFERRED EMBODIMENT

Referring now to the drawings, a seat is illustrated generally at 10, the seat 10 incorporating an adjustable lumbar support mechanism 12, a control box 14, and a pair of cables 16, 18 interconnecting the control box 14 with the support mechanism 12. Although an automotive seat is shown, it will be understood that the present invention is adaptable for use in seating of other types, such as indoor furniture or the like. The support mechanism 12, the control box 14, and the cables 16, 18 together make up an adjustable apparatus 15 for providing lumbar support in a seat 10, in accordance with the present invention.

As used herein, the terms "vertical" and "horizontal" are not meant as absolute terms, but rather, are intended to be interpreted relative to a plane passing through the back of the seat 10, which plane is generally defined by the fixed frame 20 as illustrated in FIG. 1 and as will be further described herein. It will be understood that the seat back may be reclined, in the depicted embodiment, which would change the absolute orientations of the components.

The lumbar support mechanism 12 includes a fixed frame 20 which is fixedly attached to a pair of substantially horizontal cross members 22 of the seat frame. The cross members 22 do not form a part, per se, of the present invention. In the embodiment of FIG. 1, the fixed frame 20 includes a pair of substantially vertical bars 24, with an upper horizontal cross bar 26 and a lower horizontal cross bar 28 interconnecting the vertical bars 24. The two vertical bars 24, at the top ends thereof, are bent around, and attached to, an upper seat frame cross member 22, for form a pair of upper attachment hooks 25. The lower horizontal cross bar 28 extends outwardly beyond the vertical bars 26 on either side, and is then bent upwardly at substantially a right angle, and around a lower seat cross member 22 to form a pair of lower attachment hooks 30 which wrap around and fasten the fixed frame 20, at the lower end thereof, to the lower seat frame cross member 22. The upper attachment hooks 25 and lower attachment hooks 30 are one optional way of affixing the fixed frame to the seat frame cross members 22. Alternatively, or in addition to the attachment hooks 25, 30, the frame 20 could be attached to the seat frame cross members 22 by the use of welding, conventional threaded fasteners, or other appropriate method of fastening known to those skilled in the art. In any case, the fixed frame 20 should be fixedly attached to a support frame of the seat 10.

The fixed frame 20 is, preferably, formed from a rigid material such as high-strength plastic, steel, or other suitable metal. The fixed frame 20 must be formed of relatively high-strength material because it acts as a support and as a guide for other components of the lumbar support mechanism 12.

A movable frame 32, which is formed in the general shape of a rectangle, and which is formed from a similar material to that described for the fixed frame 20, is adjustably mounted on the fixed frame 20 and is slidably movable thereon. The movable frame 32 includes an upper mounting bracket 34 and a lower mounting bracket 36 which are fixedly attached to a pair of spaced apart vertical bars 35 by welding, gluing, threaded fasteners, or the like. The upper mounting bracket 34 and lower mounting bracket 36 are substantially similar in shape, being L-shaped in cross-section as shown in FIGS. 4a and 4b, and as shown in FIG. 5, the brackets 34, 36 have holes 38 formed therein to receive plastic bushings 40, which are pressed into place, the plastic bushings 40 each having a cylindrical bore 42 formed coaxially through the center thereof to receive one of the vertical bars 24 of the fixed frame 20 therethrough. A pair of coil springs 44 are provided to connect the movable frame 32 to the upper horizontal cross bar 26 of the fixed frame 20. The springs 44 provide a means for biasing the movable frame 32 upwardly on the fixed frame 20. The upper ends of the coil springs 44 are hooked around the upper horizontal cross bar 26, of the fixed frame, and the lower ends of the springs 44 pass through the upper bracket 34 at spring mounting holes 46 which are provided in the upper bracket 34 to accommodate the springs 44, as shown in FIG. 5.

A lumbar support member 50 is adjustably mounted on the movable frame 32. The lumbar support member 50 is, generally, formed from a flat sheet of a resilient, flexible, springy material such as, e.g., steel or a suitably resilient plastic. In the depicted embodiment, the lumbar support member 50 is formed in a cross-hatched shape, with a pair of parallel spaced apart upright or vertical ribs 52, which are joined together by a plurality of horizontal ribs 54 which transversely intersect and connect the vertical ribs 52. The support member 50, as shown, in FIGS. 2A and 2B, has an upper end 55 and a lower end 56 which is disposed at a distance from the upper end at any given time. The lower end 56 of the support member 50 has two or more downwardly extending tabs 58 formed thereon, which are inserted through slots 48 provided in the lower mounting bracket 36 to accommodate the tabs 58. The upper end 55 of the support member 50, as shown in FIG. 1, has a pair of curved recesses 60 formed therein, which receive the vertical bars 24 therein, to guide and support the upper end 55 on the vertical bars 24 of the fixed frame. The uppermost horizontal rib 54 of the support member 50 extends laterally outwardly beyond the vertical ribs 52 on either side of the support member 50 to form a pair of retaining flanges 62, which may be located between the fixed frame 20 and the movable frame 32, as shown in FIG. 1, to cooperate with the tabs 48 in order to effectively retain the support member 50 in place. The upper end 55 of the support member 50 curves around and downwardly, as shown in FIGS. 1 and 2, and has a central slot 63 formed therein to receive a cable, as will be discussed below.

The lumbar support member 50, when mounted on the movable frame 32, is placed under tension and takes on an outwardly bowed, arcuate shape, as shown.

As shown in FIG. 4b, a horizontal adjustment cable 18, which has a retaining boss 64 attached to the end thereof, is attached to the upper end 55 of the support member by sliding the cable into the central slot 63 with the retaining boss 64 located at the upper side thereof. A cable housing 66 is provided and is fixedly attached to the lower mounting bracket 36 of the movable frame by any suitable method, such as the use of a bushing 68 passing through the lower bracket 36, as shown.

The vertical adjustment cable 16 also has a retaining boss 65 attached to the end thereof. The cable 16 is affixed to the lower support bracket 36 and also includes a cable housing 70 which is attached to the lower horizontal cross bar 28 of the fixed frame 20 at a centrally located widened portion of the bar 28, by the use of a bushing 69.

As shown in FIG. 2A, adjusting the length of the vertical adjustment cable 16 moves the movable frame 32 alternately up or down in a vertical direction on the fixed frame 20, while maintaining a given horizontal adjustment of the lumbar support member 50. As tension on the cable 16 is increased, the support member 50 moves downwardly with respect to the fixed frame 20. As tension on the cable 16 is released, the springs 44 pull the movable frame, with the support member 50 mounted thereon, upwardly along the fixed frame 20.

As shown in FIG. 2B, as the tension on the horizontal adjustment cable 18 is increased, the distance between the upper and lower ends 55, 56 of the support member 52 is decreased, that is, the upper end 55 is moved vertically downwardly and closer to the lower end 56, and as a result, the support member 50 is bowed outwardly, as shown by the dashed line in FIG. 2B. As tension on the cable 18 is decreased, the inherent resiliency and springiness of the support member 50 tends to move it towards a more flattened configuration as shown by the solid lines in FIG. 2B.

Referring to FIG. 3, a manual control box 14 for the adjustment of the cables 16, 18, is shown. The control box 14 includes a hollow casing 70 which has a first spool 72 and a second spool 74 rotatably mounted therein. The cables 16, 18 are affixed at the respective ends thereof to, and are partially wound onto, the first and second spools 72, 74 respectively.

A rotatable shaft 80 and associated gears 76, 78, 82, and 84 provide a means for alternately rotating either the first spool 72 or the second spool 74 to wind cable onto or unwind cable from the spool, as will be further described below. The first spool 72 is mounted within the casing 70 above the shaft 80 and has a first coaxial gear 76 centrally located on a lower surface thereof and coaxially affixed thereto for rotation therewith. In a somewhat similar fashion, the second spool 74 is mounted within the casing 70 below the shaft 80 and has a second coaxial gear 78 centrally located on an upper surface thereof and coaxially affixed thereto for rotation therewith. The shaft 80 is generally cylindrical in shape, and may have a recessed groove 94 formed medially therearound, as shown. Fixedly attached to the shaft 80 is an engaging member 86, which may be a cylindrical boss extending substantially perpendicular to the shaft, as shown. Alternatively, the engaging member may be formed in other appropriate shapes (not shown). The shaft 80 has a working end 83 which is rotatably supported in the casing and which is slidably movable in an axial direction of the shaft with respect to the casing, as shown by the arrow in FIG. 3. A spring 90 may be provided in the casing 70 to bias a detent 92 into the groove 94 to temporarily fix the position of the shaft 80 in the casing. The detent 92 may be a spherical member, as shown. The shaft may have a second recessed groove (not shown) formed therearound to receive the detent 92.

A first cylindrical helical gear 82 is coaxially disposed on the shaft 80 and has a single gear tooth formed in a spiral pattern therearound, and is supported for rotatable motion in the casing. The first helical gear 82 is enmeshed with the first coaxial gear 76 for simultaneous rotation therewith. The first helical gear 82 has a central coaxial cylindrical bore 85 formed therethrough, through which the shaft 80 passes.

The helical gear 82 has an end face 96 facing the engaging member 86 and which has a receptacle 98 formed therein. The receptacle 98 is configured to engagingly receive the engaging member therein to allow the shaft 80 to rotate the helical gear 82 to adjust the tension on the cable 16.

A second cylindrical helical gear 84 is also coaxially disposed on the shaft 80 and has a single helical gear tooth formed in a spiral pattern therearound, and is supported for rotatable motion in the casing. The second helical gear 84 is enmeshed with the second coaxial gear for simultaneous rotation therewith. The second helical gear 84 has a central coaxial cylindrical bore 87 formed therethrough, through which the shaft 80 passes. The second helical gear 84 has an end face 100 which has a receptacle 102 formed therein which is configured to engagingly receive the engaging member 86 therein for movement of the second helical gear 84.

In use, the control box 14 is operated by grasping a handle 88 which is disposed at a drive end of the shaft 80 opposite the working end 83, and by either pulling the handle 88 to move the shaft 8 outwardly and to engage the engaging member 86 in the receptacle 98 of the first helical gear 82, or, alternatively, by pushing the handle to move the shaft inwardly in the casing to engage the engaging member 86 in the receptacle 102 of the second helical gear 84. With the engaging member engaged in the receptacle of the selected helical gear, the shaft 80 and the helical gear 82 or 84 are rotated together as a unit. The selected helical gear 82 or 84 then rotates the corresponding coaxial gear and spool 72 or 74 to adjust the tension on the selected cable 16 or 18.

Although the present invention has been described herein with respect to a specific embodiment thereof, it will be understood that the foregoing description is intended to be illustrative, and not limitative. Many modifications of the present invention will occur to those skilled in the art. All such modifications which fall within the scope of the appended claims are intended to be within the scope and spirit of the present invention.

Having, thus, described the invention, what is claimed is:

1. An apparatus for independently adjusting two cables, comprising:
   a casing;
   a first spool which is rotatably mounted in the casing and which has a first coaxial gear coaxially affixed thereto;
   a second spool which is rotatably mounted in the casing and which has a second coaxial gear coaxially affixed thereto;
   a first cable which is partially wound onto the first spool and which has a first end affixed to the first spool, and a second end which is opposite the first end thereof;
   a second cable which is partially wound onto the second spool and which has a first end which is affixed thereto, and a second end which is opposite the first end thereof;
   a cylindrical shaft having a working end which is rotatably supported in the casing and which is slidably movable in an axial direction with respect thereto, the shaft having an engaging member affixed thereto;
   a first helical gear which is supported for rotatable motion in the casing, and which is enmeshed with the first coaxial gear for simultaneous rotation therewith, the first helical gear having a central bore formed therethrough and having an end face with a mating surface thereon adjacent the engaging member for contacting the engaging member of the shaft,
   a second helical gear which is supported for the rotatable motion in the casing, and which is enmeshed with the second coaxial gear for simultaneous rotation therewith, the second helical gear having a central bore formed therethrough and having an end face with a mating surface thereon adjacent the engaging member for contacting the engaging member of the shaft; means for slidably moving the shaft in the casing to align the engaging member with the mating surface of either the first or second helical gear; and
   means for rotating the shaft.

2. The apparatus of claim 1, wherein the means for rotating comprises a handle affixed to an end of the shaft opposite the working end thereof, which is disposed outside of the casing.

3. The apparatus of claim 1, wherein the means for rotating comprises an electric motor.

4. An adjustable apparatus for providing support in a seat, comprising:
   (a) a fixed frame for placement within a seat back;
   (b) a movable frame adjustably mounted on the fixed frame and slidably movable therein;
   (c) an outwardly bowed arcuate support member formed from a flexible resilient material and adjustably mounted on the movable frame, the support member having an upper end and a lower end, the lower end being disposed at a distance from the upper end;
   (d) a first spool for variably adjusting the distance between the upper end and the lower end of the support member, the first spool having a first gear coaxially affixed thereto;
   (e) a second spool for slidably moving the movable frame with respect to the fixed frame, the second spool having a second gear coaxially affixed thereto for rotation therewith;
   (f) a casing for rotatably mounting the first spool and the second spool;
   (g) a first cable partially wound onto the first spool, the first spool having a first end affixed to the first cable and a second end affixed to an end of the support member;
   (h) a second cable partially wound onto the second spool, the second cable having a first end affixed to the second spool and a second end affixed to the movable frame;
   (i) means for selectively and alternately rotating either the first spool or the second spool, the means for selectively and alternately rotating winds or unwinds the selected cable onto or from the selected spool;

the means for selectively and alternately rotating comprising:

(1) A cylindrical shaft having a working end which is rotatably supported in the casing and which is slidably movable in an axial direction with respect thereto, the shaft having an engaging member affixed thereto;

(2) a first helical gear which is supported for rotatable motion in the casing, and which is enmeshed with the first coaxial gear for simultaneous rotation therewith, the first helical gear having a central bore formed therethrough and having an end face with a mating surface thereon for contacting the engaging member of the shaft, (3) a second helical gear which is supported for the rotatable motion in the casing, and which is enmeshed with the second coaxial gear having a second helical gear having an end face with a mating surface of thereon for contacting the engaging member of the shaft, (4) means for slidably moving the shaft in the casing to align the engaging member with the mating surface of either the first or second helical gear; and (5) means for rotating the shaft.

* * * * *